(12) United States Patent
Ault et al.

(10) Patent No.: US 10,697,931 B2
(45) Date of Patent: Jun. 30, 2020

(54) METHODS OF PARTICLE MANIPULATION AND ANALYSIS

(71) Applicants: The Trustees of Princeton University, Princeton, NJ (US); University of Hawaii, Honolulu, HI (US); UT-Battelle, LLC, Oak Ridge, TN (US)

(72) Inventors: Jesse Ault, Knoxville, TN (US); Sangwoo Shin, Honolulu, HI (US); Howard A. Stone, Princeton, NJ (US); Jie Feng, Princeton, NJ (US); Patrick Warren, Wirral (GB)

(73) Assignee: The Trustees of Princeton University, Princeton, NJ (US)

( * ) Notice: Subject to any disclaimer, the term of this patent is extended or adjusted under 35 U.S.C. 154(b) by 0 days.

(21) Appl. No.: 16/210,760

(22) Filed: Dec. 5, 2018

(65) Prior Publication Data

US 2019/0170685 A1 Jun. 6, 2019

Related U.S. Application Data

(60) Provisional application No. 62/682,449, filed on Jun. 8, 2018, provisional application No. 62/594,871, filed on Dec. 5, 2017.

(51) Int. Cl.
*G01N 27/447* (2006.01)
*G01N 15/14* (2006.01)
*G01N 15/00* (2006.01)
*B01L 3/00* (2006.01)

(52) U.S. Cl.
CPC ....... *G01N 27/44721* (2013.01); *G01N 15/00* (2013.01); *G01N 15/1456* (2013.01); *B01L 3/502761* (2013.01); *G01N 2015/0053* (2013.01)

(58) Field of Classification Search
CPC ........ G01N 15/1456; G01N 27/44721; G01N 15/00; G01N 2015/0053; B01L 3/502761
USPC ..................... 356/239.1–239.8, 237.1–237.6, 356/243.2–243.8, 335–337
See application file for complete search history.

(56) References Cited

U.S. PATENT DOCUMENTS

2007/0015292 A1\* 1/2007 Ruddick ................... B03C 1/01
436/524

\* cited by examiner

*Primary Examiner* — Tri T Ton
(74) *Attorney, Agent, or Firm* — J. Clinton Wimbish; Nexsen Pruet, PLLC

(57) ABSTRACT

Methods described herein, in some embodiments, permit extraction of particle structural and/or surface charge data from gradient induced particle motion in channels. In one aspect, a method of manipulating particle motion comprises introducing a fluid into a channel, the fluid comprising particles, and driving particle accumulation to a preselected location in the channel by setting advective velocity of the fluid to offset diffusiophoretic mobility of the particles at the preselected location.

30 Claims, 16 Drawing Sheets

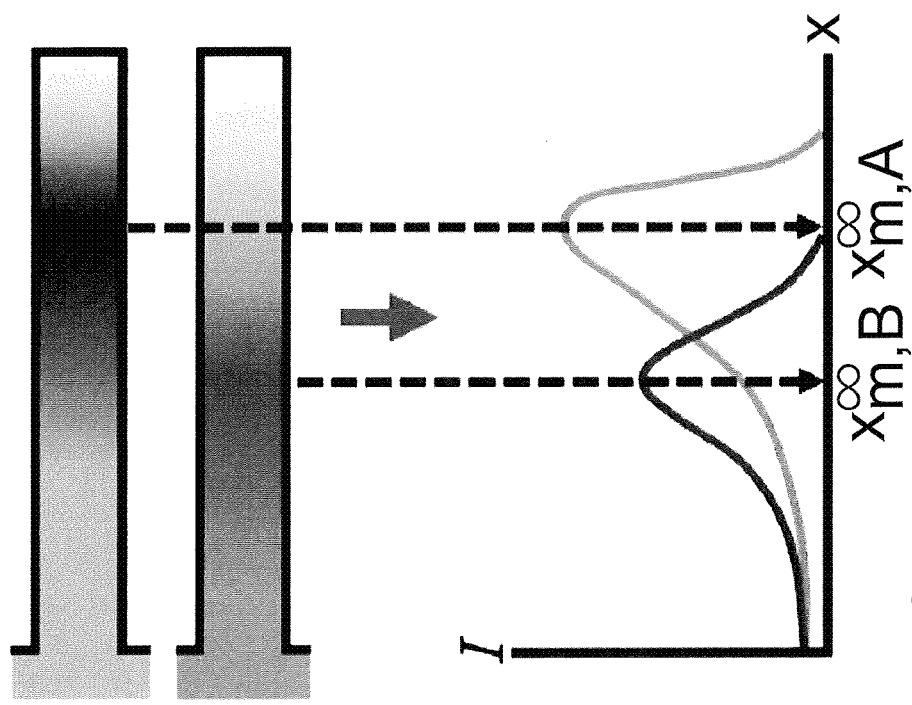
FIG. 4A
FIG. 4B
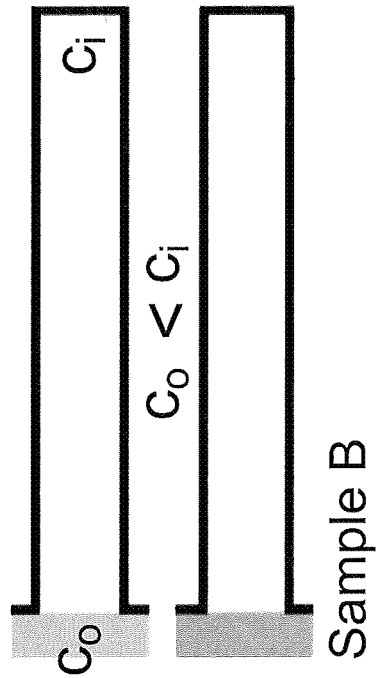
FIG. 4C
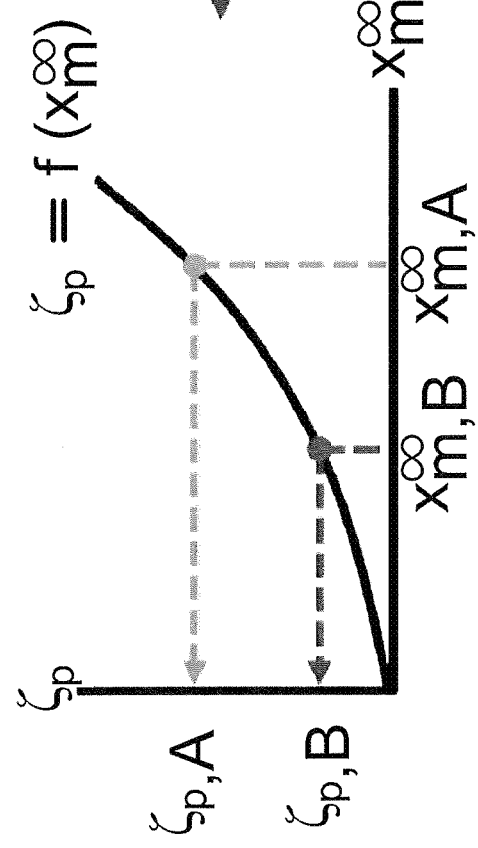
FIG. 4D

METHODS OF PARTICLE MANIPULATION AND ANALYSIS

RELATED APPLICATION DATA

The present application claims priority pursuant to 35 U.S.C. § 119(e) to U.S. Provisional Patent Application Ser. No. 62/594,871 filed Dec. 5, 2017 and U.S. Provisional Patent Application Ser. No. 62/682,449 filed Jun. 8, 2018, each of which is incorporated herein by reference in its entirety.

STATEMENT OF GOVERNMENT RIGHTS

This invention was made with government support under Grant No. DE-AC05-00OR22725 awarded by the Department of Energy and Award No. CBET1702693 awarded by the National Science Foundation. The government has certain rights in the invention.

FIELD

The present invention relates to methods of particle manipulation and analysis and, in particular, to methods employing solute gradients for particle manipulation and analysis.

BACKGROUND

Particle motion or transport in suspensions and colloids is important in many applications including drug delivery, disinfection, filtration and fluid sample analysis. Several mechanisms exist to induce directed motion of colloidal particles, such as employment of one or more external forces. External forces can include electrostatic, dielectric, magnetic, acoustic, optical and/or inertial effects. Effective application of external forces can necessitate apparatus of complex architecture and design. Additionally, use of external forces often fails to reveal meaningful information of particle systems, such as zeta potential and particle size.

SUMMARY

In view of the foregoing deficiencies, new methods of particle manipulation and analysis are needed. Methods described herein, in some embodiments, permit extraction of particle structural and/or surface charge data from gradient induced particle motion in channels. In one aspect, a method of manipulating particle motion comprises introducing a fluid into a channel, the fluid comprising particles, and driving particle accumulation to a preselected location in the channel by setting advective velocity of the fluid to offset diffusiophoretic velocity of the particles at the preselected location. In some embodiments, fluid advective velocity and diffusiophoretic velocity of the particles are equal or substantially equal, resulting in cessation of particle movement in the fluid at the preselected location. In other embodiments, the difference between fluid advective velocity and particle diffusiophoretic velocity is sufficiently small, thereby permitting particle accumulation at the preselected location for a defined period of time. Additionally, non-accumulated particles can be passed out of the channel by the advective velocity of the fluid.

In another aspect, methods of particle separation are described. A method of particle separation comprises introducing a fluid into a channel, the fluid comprising a mixture of particle species. The particle species are separated in the fluid by driving accumulation of the particle species to preselected locations in the channel via setting advective velocity of the fluid to offset diffusiophoretic velocity of a particle species at each of the preselected locations. In some embodiments, one or more of the separated particle species can be analyzed or characterized in the channel. Moreover, one or more of the separated particle species can be selectively removed from the channel.

In another aspect, methods of particle analysis are described. A method of particle analysis comprises introducing a fluid into a channel and determining the presence of analyte particles in the fluid sample by driving accumulation of the analyte particles to a preselected location in the channel. The analyte particles are driven to the preselected location by setting advective velocity of the fluid sample to offset diffusiophoretic velocity of the analyte particles at the preselected location. The presence of the analyte particles at the preselected location is subsequently detected. In other embodiments, a method of particle analysis comprises introducing a fluid sample into a channel. The presence of a plurality of analyte particle species in the fluid sample is determined by driving accumulation of the analyte particle species to preselected locations in the channel. The analyte particle species are driven by setting advective velocity of the fluid to offset diffusiophoretic velocity of an analyte particle species at each of the preselected locations. The presence of the analyte particles at each of the preselected locations is then detected.

In a further aspect, methods of determining particle zeta potential are described. A method of determining particle zeta potential, in some embodiments, comprises introducing a fluid into a channel, the fluid having an advective velocity and solute concentration gradient. Particles are introduced into the fluid and accumulated at a location in the channel where the advective velocity of the fluid is offset by diffusiophoretic velocity of the particles. The diffusiophoretic mobility of the particles is calculated from this location in the channel, and the particle zeta potential is derived from the diffusiophoretic mobility.

In other embodiments, a method of determining particle zeta potential comprises providing at least one dead-end pore containing solute having a first solute concentration and introducing a plurality of colloidal particles into the dead-end pore, the colloidal particles having positive diffusiophoretic mobility and a second solute concentration less than the first solute concentration. The image intensity in the dead-end pore is measured, and the maximum colloidal density is determined based on the image intensity. Particle zeta potential is derived from the maximum colloidal density. In some embodiments, the image intensity is measured after migration of the colloidal particles in the dead-end pore reaches a quasi-steady state.

In another aspect, methods of determining the zeta potential of channel surfaces and/or walls are described. In some embodiments, a method of determining surface or wall zeta potential comprises providing at least one dead-end pore containing a solute having a first solute concentration and introducing a plurality of colloidal particles having a second solute concentration less than the first solute concentration. The plurality of colloidal particles migrate into the dead-end pore, and the image intensity of the dead-end pore is measured prior to the colloidal particle migration reaching a quasi-steady state. The transient peak position is determined from the image intensity, and zeta potential of the pore wall is determined from the transient peak position. In some embodiments, wall zeta potential is determined by fitting the transient peak position to a power law curve, obtaining a power law exponent, and comparing the effective power law exponent to results from a two-dimensional computer simulation.

In another aspect, methods of determining the zeta potential of channel walls or surfaces via pressure measurements are described. A method of determining zeta potential of channel walls or surfaces, in some embodiments, comprises establishing a solute concentration gradient to induce a wall slip boundary condition in the channel. The pressure drop along the channel is measured, and channel wall diffusiophoretic mobility of the slip boundary condition is derived from the measured pressure drop. The zeta potential of the channel walls or surfaces is derived from this wall diffusiophoretic mobility. In some embodiments, for example, the wall diffusiophoretic mobility is derived from a relation between the measured pressure drop and the wall slip velocity of the boundary condition.

Zeta potentiometers are also described herein. In some embodiments, a zeta potentiometer comprises at least one flow channel, at least one light source for illuminating the flow channel, and an imaging device positioned to observe the illuminated flow channel. A sample storage location is adapted to provide a sample to the at least one flow channel for analysis.

These and other embodiments are further described in the following detailed description.

BRIEF DESCRIPTION OF THE DRAWINGS

FIG. 4A illustrates introduction of colloidal particles with solute concentration $c_o$ in a dead-end pore that initially contains higher solute concentration $c_i$.

FIG. 4B illustrates migration of the colloidal particles into the pore via diffusiophoresis.

FIG. 4C illustrates the condition after solute equilibration across the pore where the quasi-steady state location of the maximum colloidal density ($x_m^\infty$) is determined from the experimental image intensity (I).

FIG. 4D illustrates particle zeta potential $\zeta_p$ as a function of $x_m^\infty$.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In one aspect, methods of manipulating particle motion are provided. A method of manipulating particle motion comprises introducing a fluid into a channel, the fluid comprising particles, and driving particle accumulation to a preselected location in the channel by setting advective velocity of the fluid to offset diffusiophoretic velocity of the particles at the preselected location. In some embodiments, fluid advective velocity and diffusiophoretic velocity of the particles are equal or substantially equal, resulting in cessation of particle movement in the fluid at the preselected location. In other embodiments, the difference between fluid advective velocity and particle diffusiophoretic velocity is sufficiently small, thereby permitting particle accumulation at the preselected location for a defined period of time. Additionally, non-accumulated particles can be passed out of the channel by the advective velocity of the fluid.

Figure 1A:
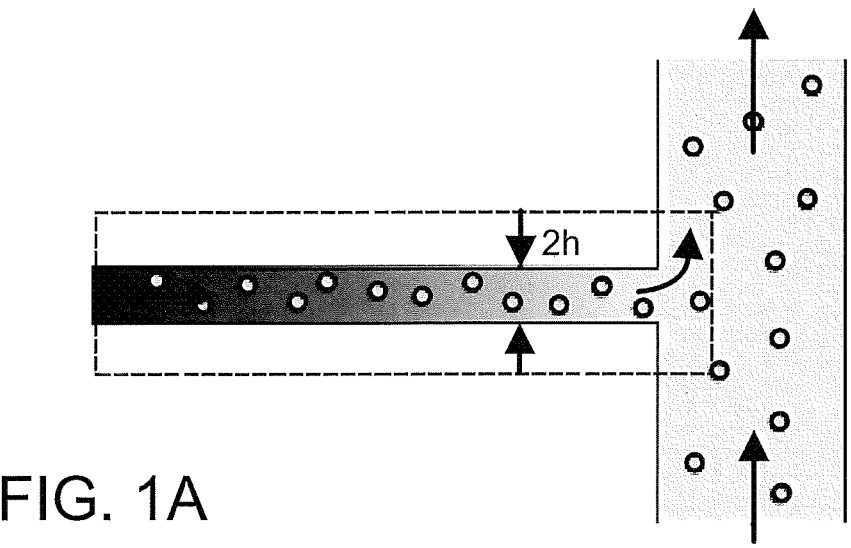
FIGS. 1A-C illustrate principles of particle manipulation according to some embodiments described herein.
Figure 1B:
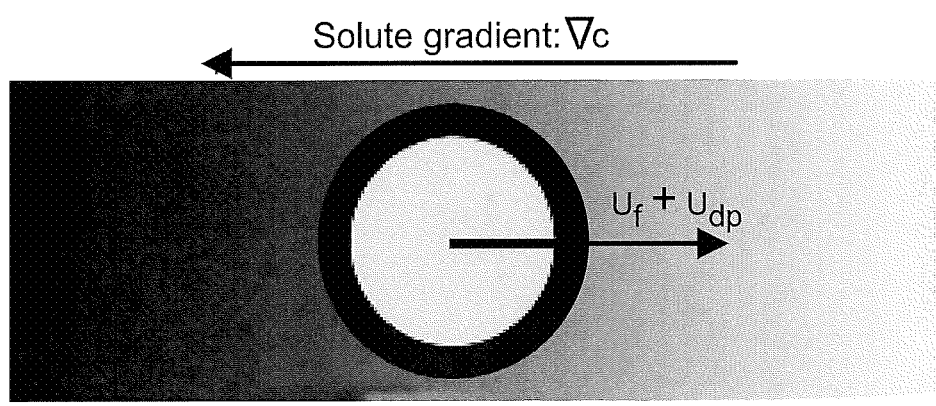
Figure 1C:
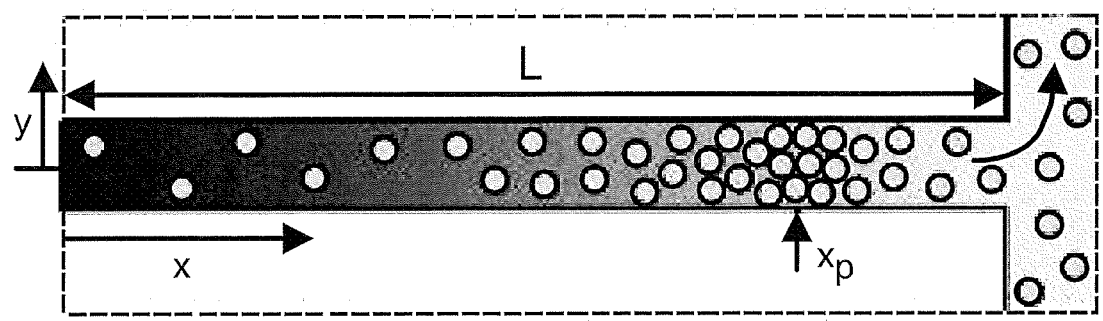

As detailed herein, diffusiophoretic velocity of the particles is a function of particle size, particle surface charge, strength of the solute gradient in the fluid and/or various combinations thereof. In particular, diffusiophoretic velocity is equal to the product of particle diffusiophoretic mobility ($\Gamma_p$) and gradient log solute concentration, $u_{dp}=\Gamma_p\nabla\ln c$. In some embodiments, the solute gradient is established by connecting the channel with a second channel transporting fluid having a differing solute concentration. FIGS. 1A-C illustrate principles of particle manipulation according to some embodiments described herein. As illustrated in FIG. 1A, a side channel 10 containing particles is in fluid communication with a second or main channel 11. The solute concentration in the fluid of the side channel 10 differs from the solute concentration in the main channel 11, thereby establishing a solute gradient in the side channel 10. Inside the side channel 10, particle motions are governed by a combination of the fluid velocity ($u_f$) and the diffusiophoretic velocity ($u_{dp}$) resulting from the solute concentration gradient. With appropriately chosen parameters for the particles of interest, the fluid and diffusiophoretic velocities can be designed to act in opposite or offsetting directions, resulting in a stable position in the pore ($x_p$) where particles can accumulate. The location of the site of accumulation can be preselected by knowing the diffusiophoretic velocity of the particles and setting the fluid velocity to offset the diffusiophoretic velocity at the preselected location. Equation (1), for example, can be employed in some embodiments to select one or more particle accumulation sites ($x_p$) in the channel.

$$x_P = Pe_s^{-1} \ln\left[\frac{\beta - e^{Pe_s}}{\left(1 + \frac{\Gamma_p}{D_s}\right)(\beta - 1)}\right] \quad (1)$$

where $Pe_s$ is the Peclet number, $\beta$ is solute concentration at the channel outlet, $c(1, y, t)$, and $D_s$ is solute diffusivity. Alternatively, depending on various underlying assmumptions, other equation(s) may be used for determining one or more particle accumulations sites ($x_p$) according to methods described herein. In some embodiments, the fluid velocity can be set to flow particles not of interest out of the channel, thereby isolating particles of interest in the channel. Subsequent to accumulation at a location in the channel, the particles can be characterized and/or selectively removed from the channel. The particles, for example, may be characterized by one or more spectroscopic techniques, in some embodiments.

Any desired particle type or species not inconsistent with the principles of the present invention can be employed with methods described herein. In some embodiments, the particles are colloidal or otherwise suspended in the fluid. Particles may include charged inorganic particles and/or charged organic particles, such as polymeric particles. In other embodiments, particles comprise one or more biomolecular species including, but not limited to, small molecule drugs, nucleic acids, proteins, vesicles and pathogens such as viruses, bacterial and other microbial species. Particles may also comprise emulsions.

Figure 2:
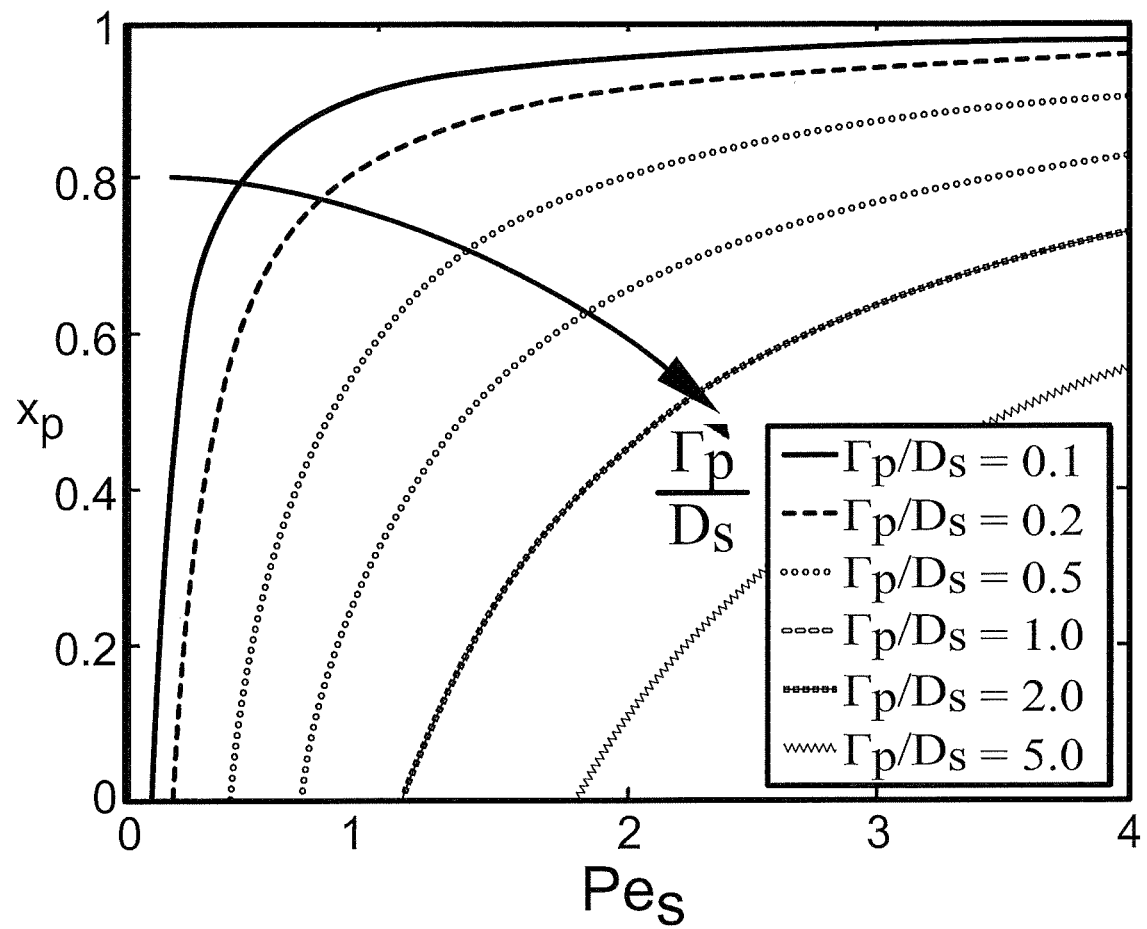
FIG. 2 illustrates peak particle concentration location ($x_p$) in the channel as a function of solute Peclet number for a variety of diffusiophoretic mobilities ($\Gamma_p/D_s$) according to some embodiments.

In another aspect, methods of particle separation are provided. A method of particle separation comprises introducing a fluid into a channel, the fluid comprising a mixture of particle species. The particle species are separated in the fluid by driving accumulation of the particle species to preselected locations in the channel via setting advective velocity of the fluid to offset diffusiophoretic velocity of a particle species at each of the preselected locations. In some embodiments, one or more of the separated particle species can be analyzed or characterized in the channel. Moreover, one or more of the separated particle species can be selectively removed from the channel. FIG. 2 illustrates peak particle concentration location ($x_p$) in the channel as a function of solute Peclet number for a variety of diffusiophoretic mobilities $\Gamma_p/D_s$, where $\Gamma_p$ is diffusiophoretic mobility and $D_s$ is the solute diffusivity. As illustrated in FIG. 2, particles with differing diffusiophoretic mobilities can be driven to differing locations in the channel according to offsetting interaction with the fluid advection velocity. With reference to Equation (1) herein, for a given $\Gamma_p/D_s$, both solute Peclet number and can be tuned to selectively determine the channel position at which particles accumulate. Note that for $x_p$<0, particle diffusiophoresis is too strong relative to fluid advection, and particles will be continuously pumped upstream without accumulating in the channel.

Figure 3:
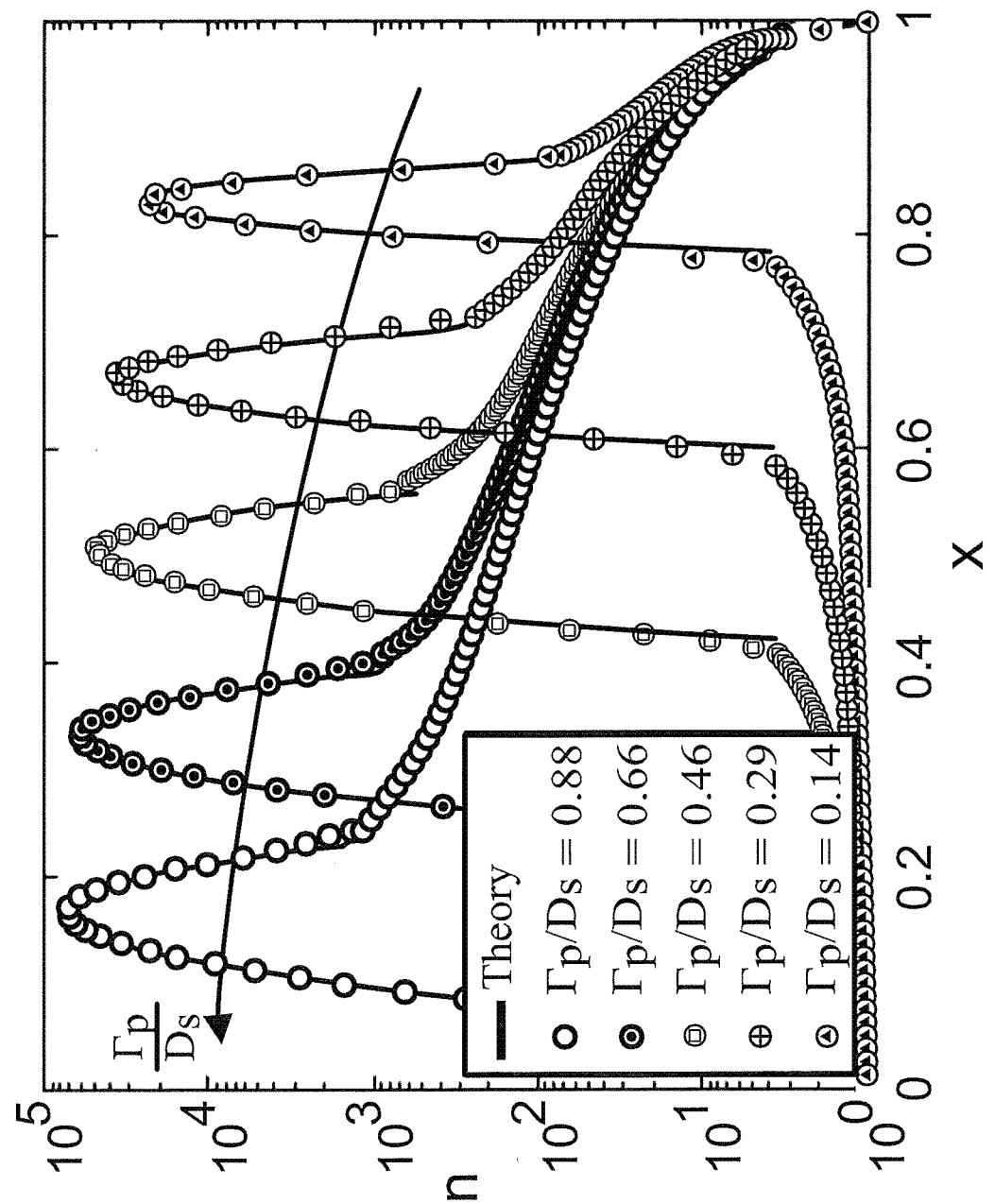
FIG. 3 illustrates suspended concentration profiles for particles with differing diffusiophoretic mobilities according to some embodiments.

FIG. 3 illustrates suspended concentration profiles for particles with differing diffusiophoretic mobilities according to some embodiments. As can be seen, particles with larger $\Gamma_p/D_s$ experience diffusiophoresis more strongly and are able to propagate further upstream towards the channel inlet. As time progresses, particles continue to focus at separate locations, and particle concentrations will continue to grow in the separate locations. Another way to interpret the results of FIG. 3 is to consider a channel simultaneously filled with uniform dilute concentrations of five different types of particles with the values $\Gamma_p/D_s$ specified in the figure. Due to the combined influences of fluid advection and diffusiophoresis, as time passes, the particle concentration will begin to separate and focus at different locations, forming distinct concentration peaks, effectively sorting and focusing each of the particles based on their $\Gamma_p/D_s$. For example, since the peak concentration locations are steady in time after an initial transient time t=O(1), and those locations are uniquely determined by the system parameters $Pe_s$, $\Gamma_p/D_s$, and $\beta$, it is straightforward to establish $\Gamma_p$ of the particles. In a microfluidic experiment with fixed $\beta$ and $Pe_s$, the position of peak concentration ($x_p$) with unknown $\Gamma_p$ can be measured. The unknown diffusiophoretic mobility, in some embodiments, can subsequently be directly calculated from Equation (2):

$$\Gamma_p = D_s\left(\frac{\beta - e^{Pe_s}}{e^{Pe_s x_p}(\beta - 1)} - 1\right) \quad (2)$$

This configuration, therefore, has potential applications ranging from particle sorting, separation, and focusing, to diagnostic and measurement applications. In some embodiments, fluid advective velocity and diffusiophoretic velocity of the particles are equal or substantially equal resulting in cessation or suspension of particle movement in the fluid at one or more channel locations. In other embodiments, the difference between fluid advective velocity and particle diffusiophoretic velocity is sufficiently small, thereby permitting particle accumulation at the preselected location for a period of time.

In another aspect, methods of particle analysis are described. A method of particle analysis comprises introducing a fluid into a channel and determining the presence of analyte particles in the fluid sample by driving accumulation of the analyte particles to a preselected location in the channel. The analyte particles are driven by setting advective velocity of the fluid sample in the channel to offset diffusiophoretic velocity of the analyte particles at the preselected location. The presence of the analyte particles at the preselected location is subsequently detected. In some embodiments, the fluid sample comprises a plurality of analyte particle species. In such embodiments, the presence of analyte particle species is determined by driving accumulation of the analyte particle species to preselected locations in the channel via setting advective velocity of the fluid in the channel to offset diffusiophoretic velocity of an analyte particle species at each of the preselected locations. The presence of the analyte particles at each of the preselected locations is then detected.

In the present methods of particle analysis, advective fluid velocity and solute gradients can be selected to isolate particles of interest in a fluid sample. For example, an investigator can determine or classify particles of interest based on their diffusiophoretic velocities. Advective fluid velocity is then selected, such that any particles having the desired diffusiophoretic velocities are isolated in the channel at one or more locations. According to the principles described herein, the location(s) of particle isolation are calculated based on fluid advective velocity and diffusiophoretic velocity. Particles not exhibiting diffusiophoretic velocities of interest can pass out of the channel or be isolated at another location in the channel. In this way, particles of interest in an unknown sample can be isolated and identified and/or characterized. One of more species of isolated particles may also be selectively removed from the channel.

In a further aspect, methods of determining particle zeta potential are described. In some embodiments, a method of determining particle zeta potential comprises introducing a fluid into a channel, the fluid having an advective velocity and solute concentration gradient. The particles are accumulated at a location in the channel where the advective velocity of the fluid is offset by diffusiophoretic velocity of the particles. The diffusiophoretic mobility ($\Gamma_p$) of the particles is calculated using this location in the channel ($x_p$), and the zeta potential of the particles is derived from the diffusiophoretic mobility. In some embodiments, for example, particle zeta potential ($\zeta_p$) is derived from diffusiophoretic mobility according to Equations (3)-(5):

$$\Gamma_p = \frac{\epsilon}{2\eta}\left(\frac{k_B T}{Ze}\right)^2 \frac{u_o}{1 - u_1/(u_0 \kappa a)} \quad (3)$$

where $\epsilon$ is the permittivity of the medium, $\eta$ is the viscosity of the medium, $k_B$ is the Boltzman constant, T is the absolute temperature, and e is the elementary charge. $u_0$ and $u_1$ are functions of zeta potential and when estimating $k^{-1}$, the concentration is assumed to be $(c_i+c_o)/2$. Here, $$u_0 = 2\left(\frac{D_- - D_+}{D_- + D_+}\right)\frac{Ze\zeta_p}{k_B T} + 8 \ln \cosh\left(\frac{Ze\zeta_p}{k_B T}\right) \quad (4)$$

where $D_-$ and $D_+$ are, respectively, the diffusivities of cations and anions. $u_1$ is a series of exponential integrals where the lengthy expressions can be found in Prieve et al., *J Fluid Mech.*, 148:247-269, 1984. For very large particles or vanishingly thin Debye layer ($\kappa a \to \infty$), $$\Gamma_p = \frac{\epsilon}{\eta}\left(\frac{k_B T}{Ze}\right)^2\left(\left(\frac{D_- - D_+}{D_- + D_+}\right)\frac{Ze\zeta_p}{k_B T} + 4 \ln \cosh\left(\frac{Ze\zeta_p}{4k_B T}\right)\right) \quad (5)$$

where $\zeta_p$ is particle zeta potential. As described herein, the solute gradient can be established, in some embodiments, by connecting the channel with a second channel transporting fluid having a differing solute concentration.

In another aspect, a method of determining particle zeta potential comprises providing at least one dead-end pore containing solute having a first solute concentration and introducing a plurality of colloidal particles into the dead end pore, the colloidal particles having positive diffusiophoretic mobility and a second solute concentration less than the first solute concentration. The image intensity in the dead-end pore is measured, and the maximum colloidal density is determined based on the image intensity. Particle zeta potential is derived from the maximum colloidal density. In some embodiments, the image intensity is measured after migration of the colloidal particles in the dead-end pore reaches a quasi-steady state.

An overview of this zeta potentiometry technique is provided in FIGS. 4A-D. Colloidal particles with solute concentration $c_o$ are introduced to a dead-end pore containing higher solute concentration $c_i$, as illustrated in FIG. 4A, leading to diffusiophoretic particle migration into/from the dead-end pore FIG. 4B. The direction of motion is determined by the particle surface charge and by the diffusivity difference between anions and cations. The particle motion is also influenced by the presence of the wall surface charge, which induces diffusioosmosis that results in a circulating fluid flow. During migration, the particles accumulate near the colloidal front since the particle velocity $u_p$ is proportional to the gradient of the logarithmic solute concentration, i.e. $u_p=\Gamma_p\nabla\ln c$, where $\Gamma_p$ is the particle diffusiophoretic mobility, which strongly depends on the particle zeta potential $\zeta_p$ as shown in Equation 5 and FIG. 4B. After the solute equilibrates across the pore, the colloidal distribution becomes quasi-steady since the particle's diffusivity is negligible compared to that of the solute. The quasi-steady location of the maximum colloidal density $x_m^\infty$ is highly sensitive to $\zeta_p$. Thus, by locating $x_m^\infty$ from the intensity distribution, $\zeta_p$ can be obtained as provided in FIGS. 4C-D.

Figure 5A:
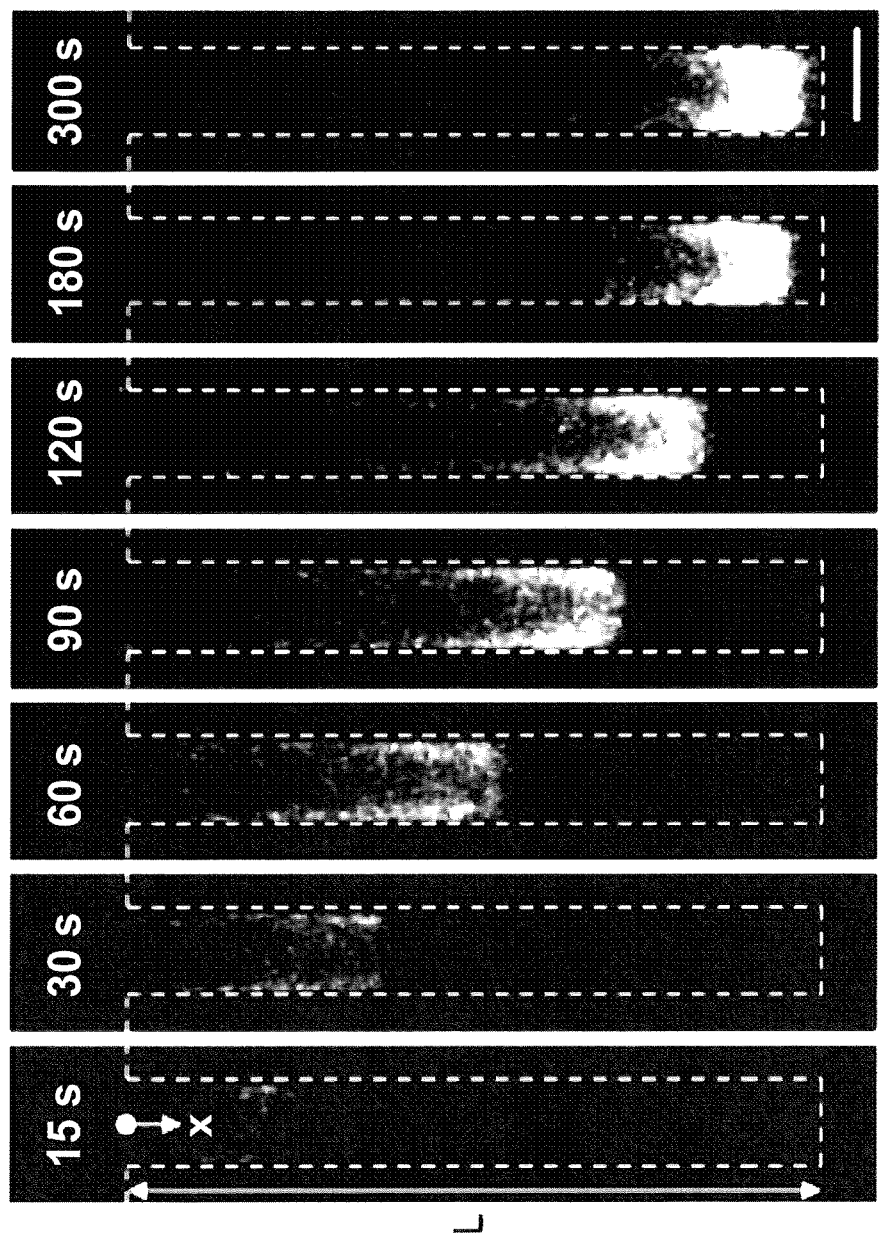
FIG. 5A illustrates colloid particle migration into a dead-end pore induced by solute gradients.
Figures 5B, 5C:
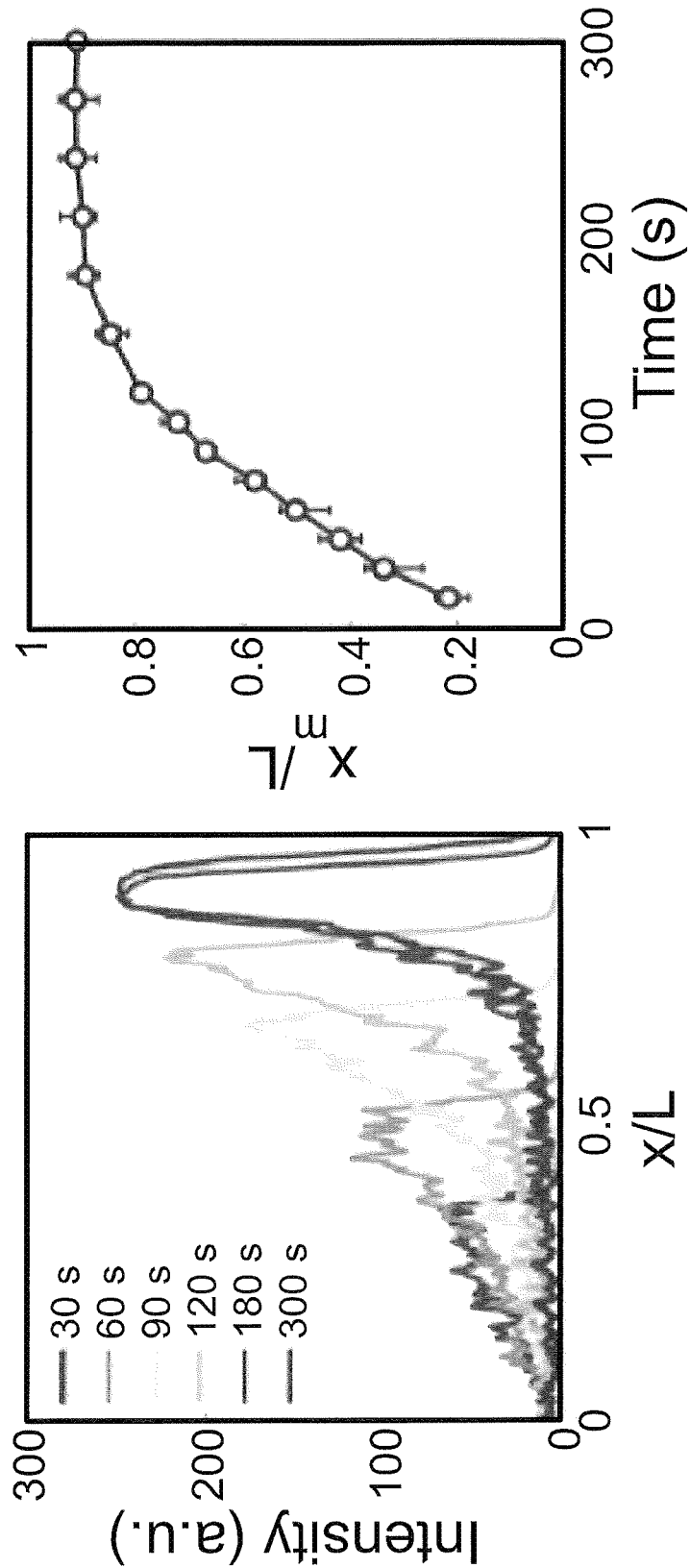
FIG. 5B illustrates the corresponding fluorescence intensity distribution of the colloidal particles migrating into the dead-end pore.
FIG. 5C illustrates the normalized location of the maximum intensity ($x_m/L$) over time.

The foregoing principles are illustrated via the migration of fluorescent colloidal particles (polystyrene, diameter=0.99 μm) into a dead-end pore via NaCl gradient ($c_i$=10×10$^{-3}$ M, $c_o$=0.1×10$^{-3}$ M). The polystyrene particle migration is illustrated in FIG. 5A. NaCl is a favorable solute choice because it can generate significant LJP. Furthermore, the induced electrophoresis and chemiphoresis are in the same direction under practical conditions, enabling relatively strong diffusiophoresis. As mentioned, particles accumulate near the colloidal front due to the logarithmic dependence on the solute gradient. To identify the location of the maximum colloidal density $x_m(t)$, the particle distribution can be inferred from the fluorescence intensity distribution along the pore as shown in FIG. 5B. Over time, $x_m$ asymptotically approaches its quasi-steady final position within a few minutes (FIG. 5C). The location of the quasi-steady maximum colloid density $x_m^\infty$ is defined as the peak location at three times the solute diffusion time scale $\tau_s$, which in the present case is $$300 \ s \left(\tau_s \approx \frac{l^2}{D_s} \approx 100 \ s,\right.$$

where l=400 μm is the pore length and $D_s$=1600 μm$^2$ s$^{-1}$ is the solute ambipolar diffusivity).

Although diffusiophoresis is a complex interfacial phenomenon occurring over nanometer length scales for individual particles, the macroscopic particle dynamics can be predicted by solving advection-diffusion equations as follows. The transient particle dynamics in a dead-end pore can be modeled by solving advection-diffusion equations for the solute and the particles. The equations for the solute c and the particles n are, respectively, given as:

$$\frac{\partial c}{\partial t} = D_s \nabla^2 c - \nabla \cdot (u_f c) \quad (6)$$

$$\frac{\partial n}{\partial t} = D_p \nabla^2 n - \nabla \cdot (u_p n) \quad (7)$$

where $u_f$ is the fluid velocity and $u_p = u_f + u_{dp}$ is the particle velocity, which is the sum of the fluid advection ($u_f$) and the particle diffusiophoresis ($u_{dp}$). $D_s$ is the ambipolar diffusivity of the solute and $D_p$ is the particle diffusivity, which is obtained from the Stokes-Einstein relation to obtain $D_p$.

The length, width, and height of the dead-end pore are, L, w, and 2 h, respectively. The coordinates in length, width, and height are denoted as, respectively, x, y, and z, where the origin is located at the center of the pore inlet. The boundary conditions at the inlet are $c(x=0, y, z, t)=c_o$ and $n(x=0, y, z, t)=1$ while a no flux condition is imposed at the channel walls. Initial conditions are $c(x, y, z, 0)=c_i$ and $n(x, y, z, 0)=0$. Since the flow speed in the dead-end pore is due to the circulating flow ϑ (10 µm/s), the Peclet number in the transverse direction to the pore axis of the solute migrating into a dead-end pore is far less than unity, indicating diffusion dominant transport. Thus, for the reduced order modeling (1D and 2D), the influence of flow advection on the solute distribution is neglected and diffusion for the solute transport is only considered. Due to the boundary condition, the solution simplifies to $c(x, y, z, t)=c(x, t)$.

The analytical solution to the transient solute concentration in a dead-end pore is given by Equation (8):

$$c(x, t) = c_o + (c_i - c_o) \sum_{n=0}^{\infty} b_n \sin\left(\frac{\lambda_n x}{L}\right) e^{\lambda_n^2 D_s t / L^2} \quad (8)$$

where $b_n = 2(1-1\cos\lambda_n)/\lambda_n$ and $\lambda_n = (2n+1)\pi/2$. However, for full 3D modeling, the influence of flow advection on the solute distribution is accounted for, and the full advection diffusion equation is solved.

To account for the fluid advection induced by diffusioosmosis, an effective wall slip velocity $u_w = -\Gamma_w \nabla \ln c$ is imposed along the channel surface. For reduced order modeling (2D), the analytical solution to the flow profile in the length (x) and height (z) directions is obtained by using the lubrication approximation with a zero net volume flux constraint across the cross-section of the channel. The velocity field $u_f$ (x, z)=($u_{f,x}$(x, z), $u_{f,z}$(x, z)) is given by Equations (9a) and (9b):

$$u_x(x, z) = -\frac{\Gamma_w}{2} \frac{d\ln c}{dx} \left[3\left(\frac{z}{h}\right)^2 - 1\right] \quad (9a)$$

$$u_z(x, z) = \frac{\Gamma_w}{2} \frac{d^2\ln c}{dx^2} \left[z\left(\left(\frac{z}{h}\right)^2 - 1\right)\right] \quad (9b)$$

Using these equations for the flow advection, the advection-diffusion equation for the particles is numerically solved using MATLAB in the reduced order simulations.

Figure 5D:
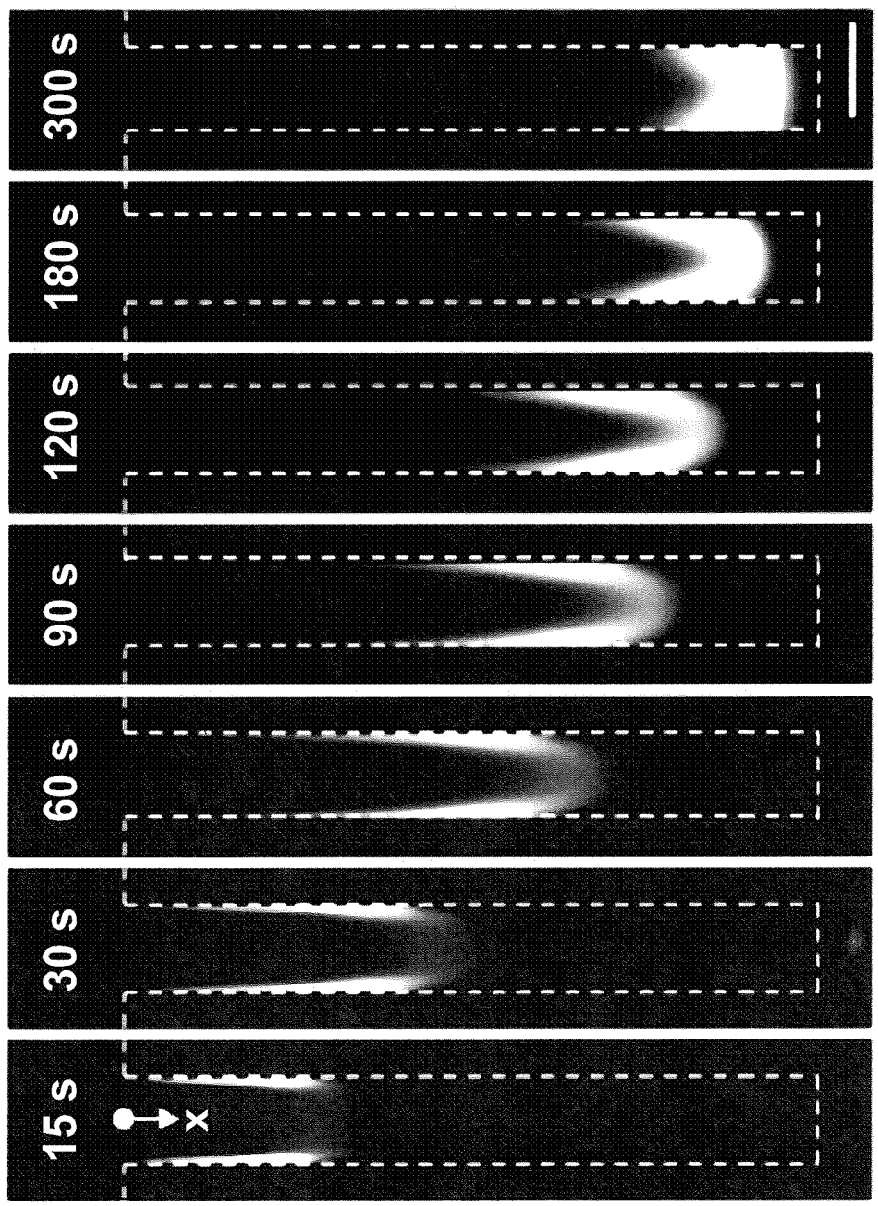
FIG. 5D is an image sequence of time-dependent colloidal particle distribution in the dead-end pore.
Figure 5F:
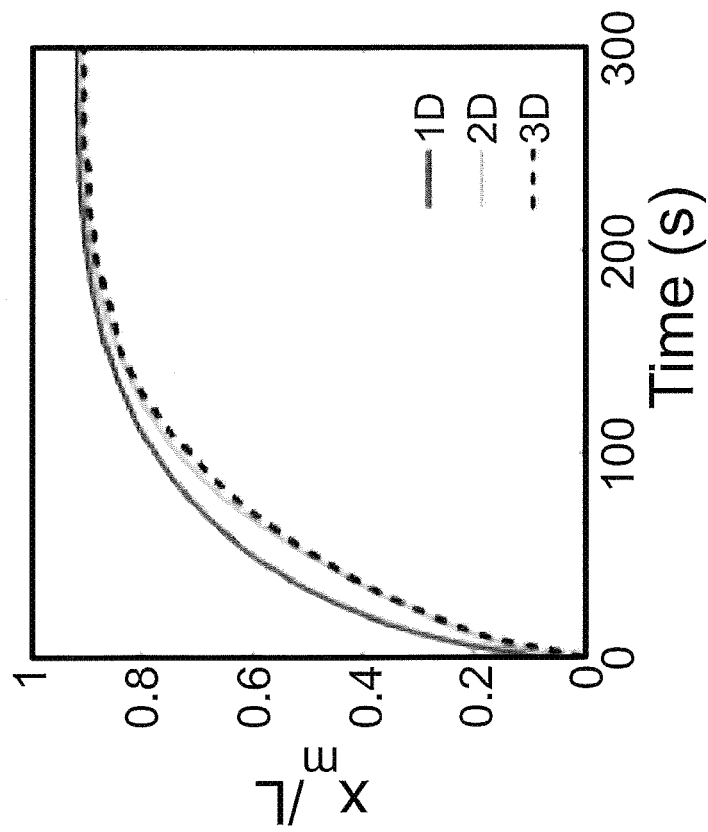
FIG. 5F illustrates the maximum intensity distribution over time using 3D, 2D, and 1D-simulation results.
Figure 5E:
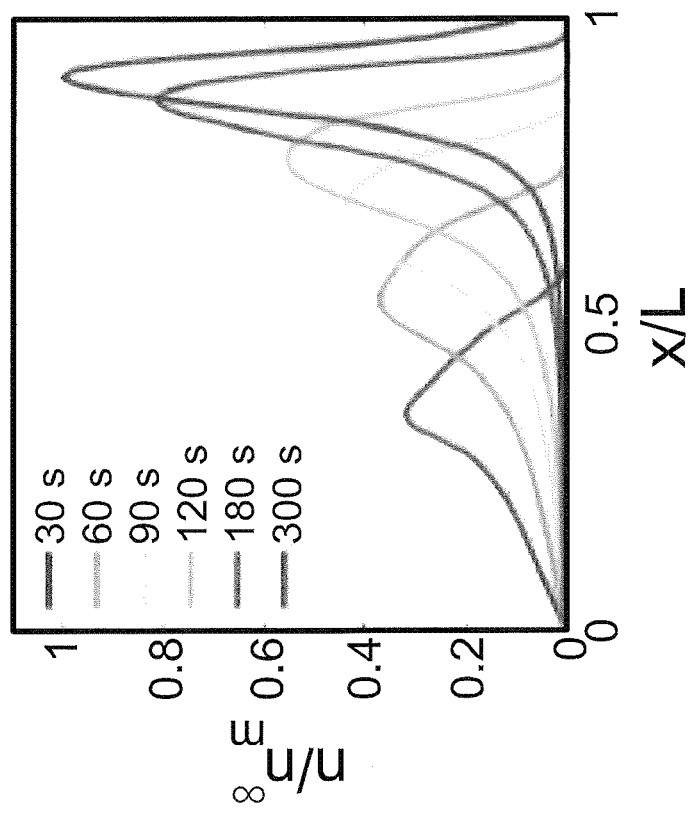
FIG. 5E illustrates the cross-section averaged colloidal particle density distribution in the dead-end pore normalized by the maximum density ($n/n_m^\infty$) at 300 s.

By solving equations for both solute and particle suspension inside a dead-end pore and considering the fluid advection due to the diffusioosmosis, the time-dependent particle distribution (FIGS. 5D and 5E) including $x_m(t)$ (FIG. 5F) can be predicted with excellent agreement with the experimental results illustrated in FIGS. 5a-c.

Due to the anisotropic geometry of the pore (length×width×height=400 µm×48 µm×10 µm), reduced-order modeling gives excellent agreement with full 3D numerical results. For example, 1D modeling, which only considers the length dimension, provides good agreement for $x_m^\infty$ (see 1D curve in FIG. 5F), while 2D modeling, which accounts for the diffusioosmotic flow induced by the wall surface charge, also successfully predicts the transient dynamics (2D curve in FIG. 5f). Since $x_m^\infty$ is only considered when determining $\zeta_p$, 1D modeling is sufficient, offering computational efficiency and simplicity.

Figure 6:
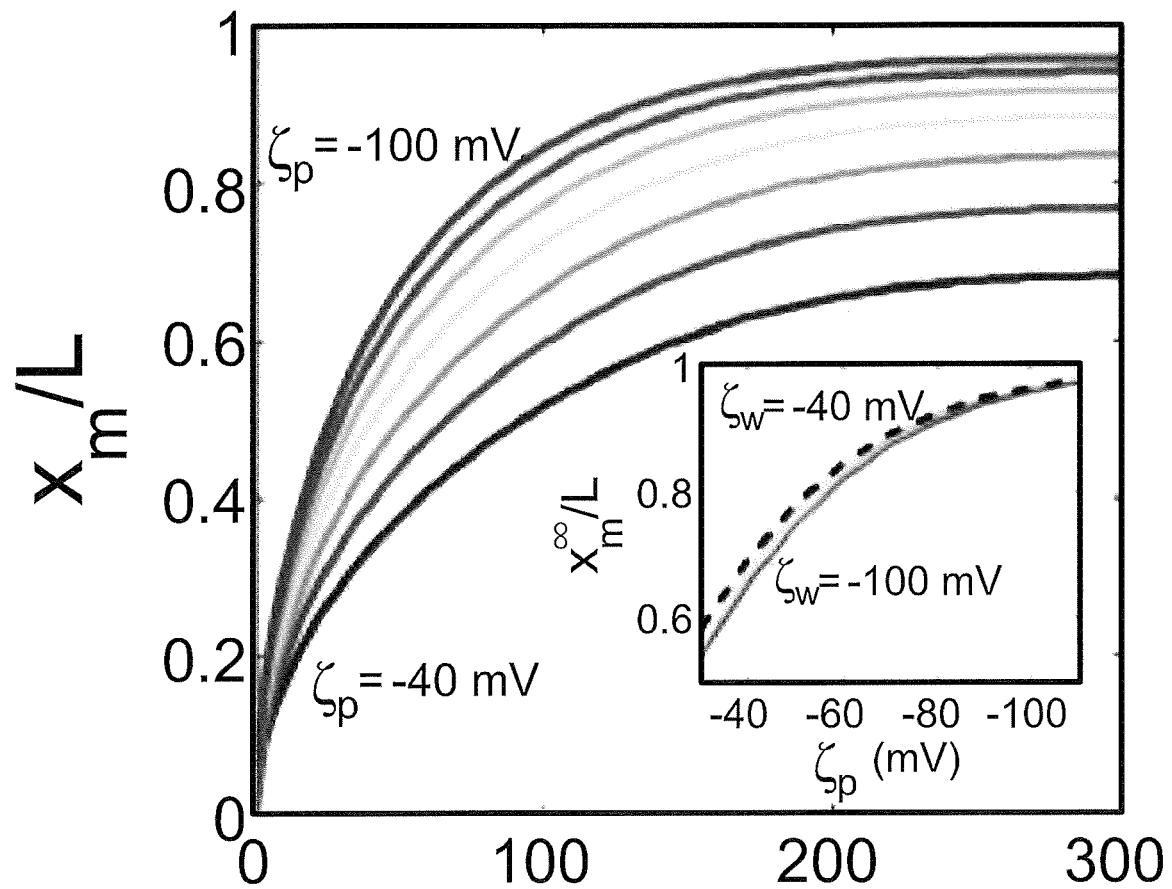
FIG. 6 illustrates 1D-simulations of maximum intensity location ($x_m/L$) over time for $\zeta_p$ ranging from −40 mV-100 mV with a step of 10 mV. The inset indicates $x_m^\infty/L$ at 300 s versus $\zeta_p$, where the dashed curve corresponds to 1D-simulation results and the solid curves correspond to 2D-simulation results.

By solving the 1D advection-diffusion equation for the particles as described herein, where advection is due only to diffusiophoresis, $x_m(t)$ can be calculated for various particle zeta potentials as shown in FIG. 6. The results indicate that $x_m^\infty$ is sensitive to $\zeta_p$, as shown in the inset of FIG. 6. Thus $x_m^\infty$ is measured experimentally and $\zeta_p$ is extracted by comparison with one or more simulations, including 1D simulations. Zeta potentials ($\zeta_{p,DP}$) of a variety of particles were measured according to this solute gradient method. The results compared well with the zeta potentials ($\zeta_{ELS}$) measured by standard electrophoretic light scattering as evidenced in Table I.

TABLE I

Zeta Potentials of various colloidal particles measured via solute gradients and electrophoretic light scattering

| Particle | 2a (µm)[1] | $\zeta_{p, DP}$ (mV) | $\zeta_{p, ELS}$ (mV) | Solution conditions[2] |
|---|---|---|---|---|
| Polystyrene (Bangs Lab) | 0.99 | −80.1 ± 5.3 | −67.5 ± 4.9 | |
| Polystyrene (Invitrogen) | 1.1 | −81.4 ± 3.4 | −79.2 ± 6.8 | |
| Polystyrene (Spherotech) | 0.91 | −87.2 ± 4.0 | −72.5 ± 5.4 | |
| Carboxylate-modified polystyrene | 1.2 | −72.1 ± 5.2 | −74.7 ± 6.7 | |
| Sulfate-modified polystyrene | 0.53 | −85.6 ± 3.9 | −59.1 ± 4.9 | |
| Amine-modified polystyrene | 1.1 | 61.2 ± 4.4 | 58.8 ± 4.7 | |
| Decane | 0.53 | −88.7 ± 5.7 | −104.3 ± 8.2 | 50 mM NaCl, 1 mM SDS |
| λ-DNA | 0.29 | −57.9 ± 6.4 | −30.4 ± 10.9 | pH = 8.3 |
| Unilamellar lipid vesicles | 0.86 | −54.2 ± 13.3 | −89.5 ± 10.4 | pH = 7.2, 1 mM NaCl |
| Non-fluorescent polystyrene | 0.92 | −84.5 ± 4.3 | −68.8 ± 6.6 | |
| Polymethyl methacrylate | 1.3 | −52.1 ± 6.6 | −61.2 ± 7.8 | |

[1]Measured by dynamic light scattering
[2]c = (c$_i$ + c$_o$)/2 ≈ 5 mM NaCl and pH ≈ 6.0 unless otherwise noted.

Figure 10:
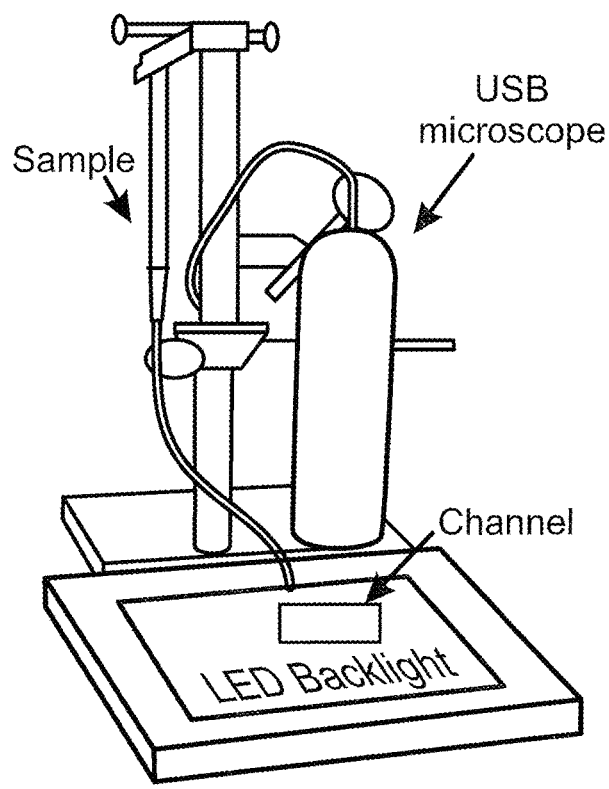
FIG. 10 illustrates a zeta potentiometer according to some embodiments.

In view of the foregoing methods, zeta potentiometers are also described herein. In some embodiments, a zeta potentiometer comprises at least one flow channel, at least one light source for illuminating the flow channel, and an imaging device positioned to observe the illuminated flow channel. A sample storage location is adapted to provide a sample to the at least one flow channel for analysis. FIG. 10 illustrates a zeta potentiometer according to some embodiments. The zeta potentiometer in FIG. 10 employs a USB microscope as the imaging device and light emitting diode (LED) backlight for channel illumination. The microscope and LED are positioned opposite one another. Additionally, the sample storage location is located above the channel, permitting sample flow to the channel via hydrostatic pressure. The zeta potentiometer of FIG. 10 can require small sample volumes, generally less than 100 μm, while providing fast analytical times, generally less than 5 minutes. In some embodiments, zeta potentiometers described herein do not employ any external forces in the zeta potential analysis. Prior zeta potentiometers, for example, have employed external electric and/or magnetic fields in the particle analysis. Electro-acoustic forces have also been used in prior zeta potentiometers for particle analysis. As shown herein, the described zeta potentiometers and associated diffusiophoretic methods obviate the need for these external forces in particle analysis.

In another aspect, methods of determining zeta potential of channel surfaces and/or walls are described. In some embodiments, a method of determining surface or wall zeta potential comprises providing at least one dead-end pore containing a solute having a first solute concentration and introducing a plurality of colloidal particles having a second solute concentration less than the first solute concentration. The plurality of colloidal particles migrate into the dead-end pore, and the image intensity of the dead-end pore is measured prior to the colloidal particle migration reaching a quasi-steady state. The transient peak position is determined from the image intensity, and zeta potential of the pore wall is determined from the transient peak position. In some embodiments, wall zeta potential is determined by fitting the transient peak position to a power law curve, obtaining a power law exponent, and comparing the effective power law exponent to results from a two-dimensional computer simulation.

Figure 7A:
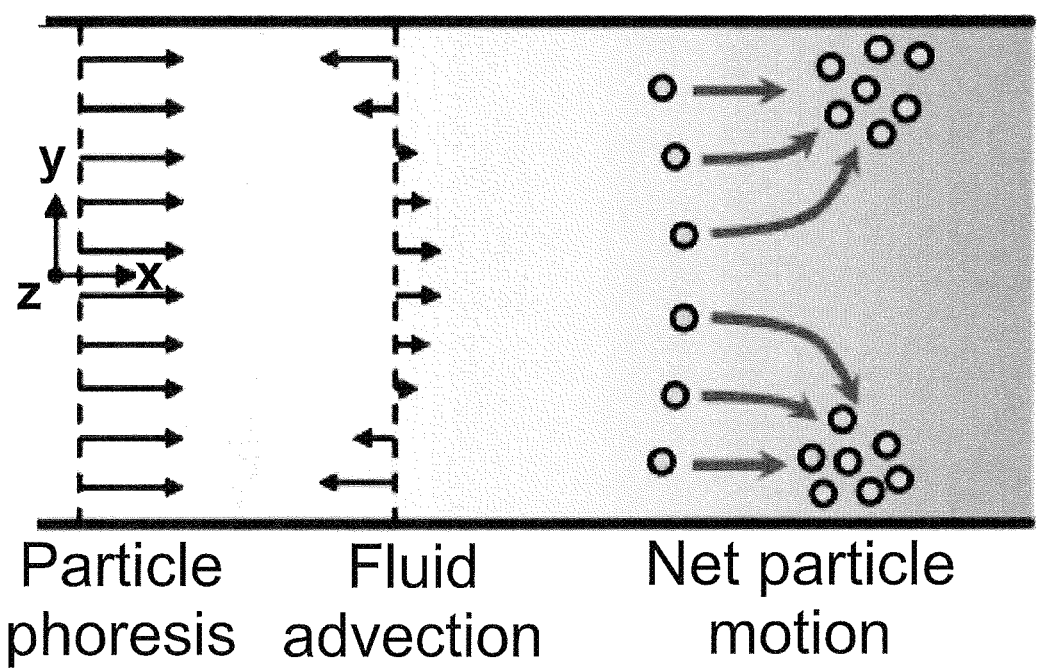
FIG. 7A illustrates particle trajectories in the presence of diffusioosmotic flow induced by nonzero wall zeta potential $\zeta_w$.

Whereas the quasi-steady location of the maximum particle density $x_m^\infty$ was used to determine $\zeta_p$, the transient particle dynamics during early times contain information about wall zeta potential $\zeta_w$ due to the presence of diffusioosmotic flow induced by the solute gradients. Although the net fluid flow in a dead-end pore is zero due to confinement, nonzero local flow velocities exist because of balance between diffusioosmosis and induced pressure gradients driving opposite motions. For example, the curved colloidal front of FIG. 5a further confirms the contribution of pressure-driven flow. This flow balance results in circulating flow with magnitude proportional to $|\nabla \ln c|$ that propagates along the solute diffusion. For a negatively charged wall exposited to a solute gradient directed in the pore, the resulting flow diverges from the center to the wall as illustrated in FIG. 7A. This flow pushes the particles, which have entered at the early stage, away from the center toward the wall retarding the overall migration toward the end of the pore (FIG. 7A).

Figure 7C:
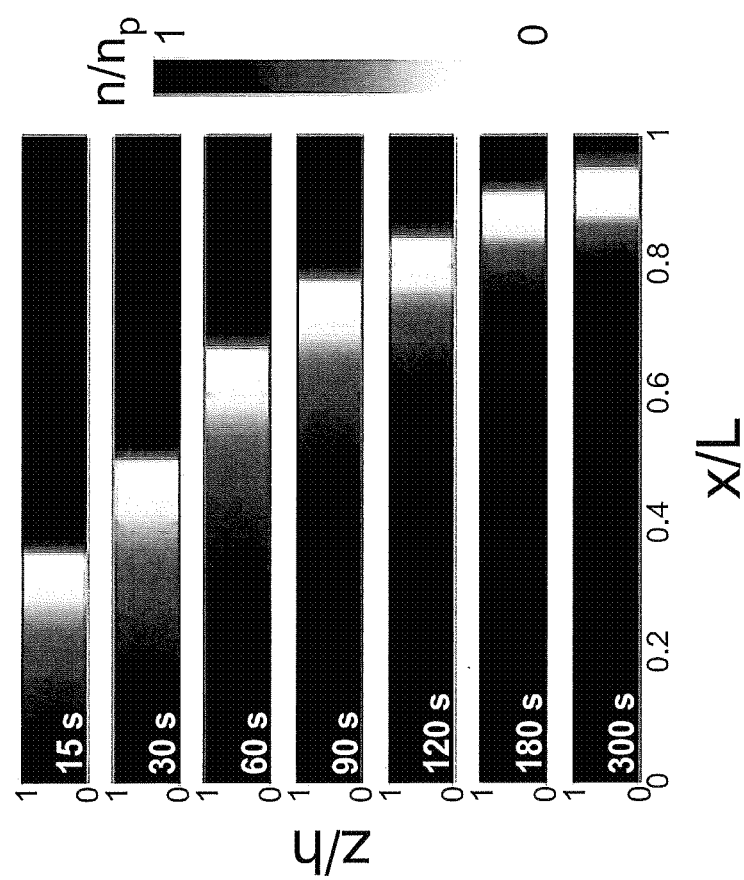
FIG. 7C illustrates a 2D simulation of particle distribution in a channel without wall slip flow.
Figure 7B:
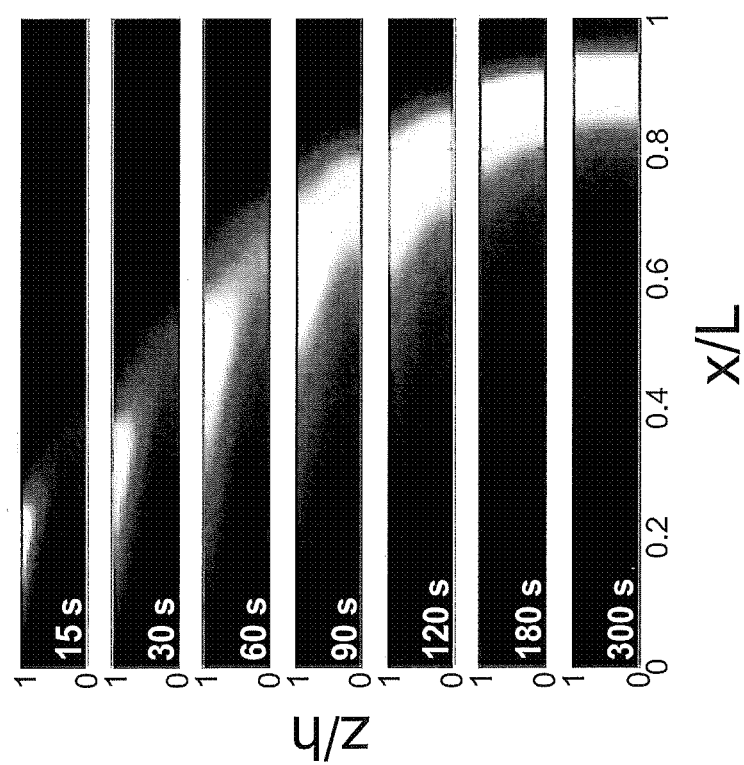
FIG. 7B illustrates a 2D simulation of particle distribution in a channel with wall slip flow.

Particle dynamics under such a circulating fluid flow are simulated by imposing a wall slip velocity, $u_w = -\Gamma_w \nabla \ln c$, where $\Gamma_w$ is the wall diffusiophoretic mobility, which is determined by $\zeta_w$. Due the channel's narrow cross-section, it may be treated as a 2D system considering the dimensions in the length (x) and height (z) directions, thereby reducing computational costs. The 2D approximation further allows analytical solutions for circulating fluid flow to be obtained using the lubrication approximation. Particle distributions calculated from 2D simulations are presented in FIGS. 7B and 7C, showing the influence of this fluid flow on the particle dynamics. The presence of this circulating flow advects the particles toward the wall, retarding the motion of $x_m(t)$, especially at times early times, such as less than 60 s. However, the circulating flow is weakened over time, and the transverse flow component exists only far from the inlet. Consequently, particles entering the in the late stage are hardly influenced by fluid advection, ultimately resulting in similar $x_m^\infty$ regardless of $\zeta_w$.

Figure 7D:
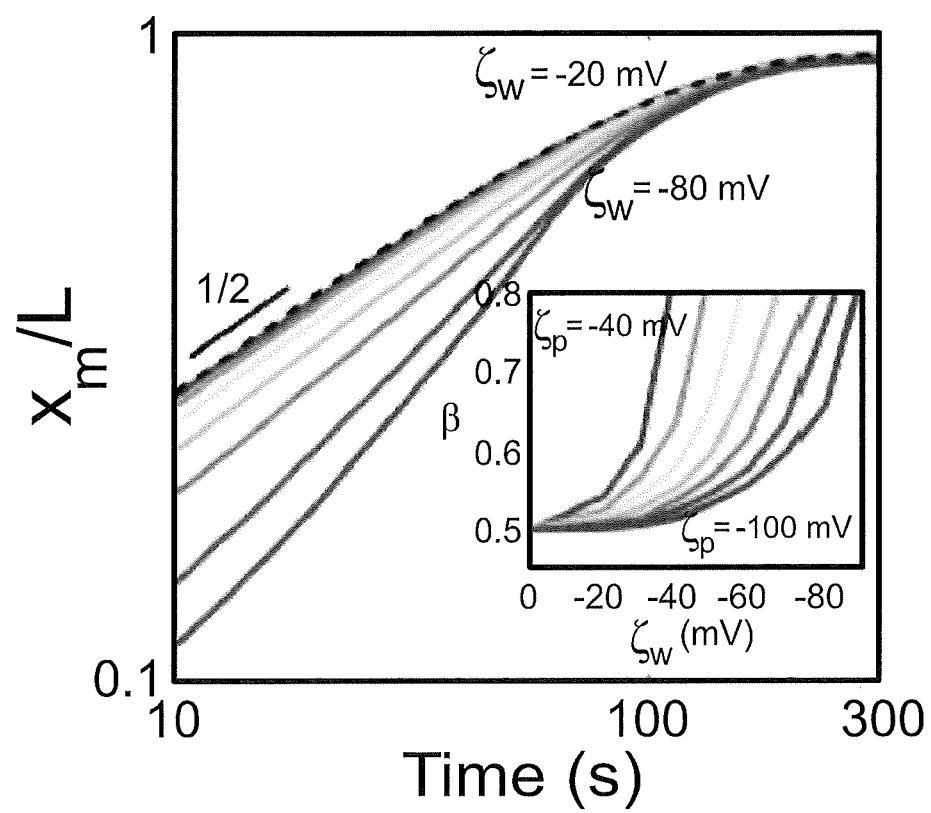
FIG. 7D provides 2D numerical results of $x_m/L$ over time plotted in log-log scale for various $\zeta_w$ (−20 to −80 mV) with $\zeta_p$ of −80 mV. The dashed curve represents 1D results, which neglect fluid flow. The inset is $\beta$ versus $\zeta_w$ at early times (t<60 s) for a wide range of $\zeta_{p,w}$ values.

During this time-dependent behavior, at early times (<60 s) the transient peak position deviates from diffusive ingress $(x_m(t) \sim t^{1/2})$ in a power-law-like behavior (i.e., $x_m(t) \sim t^\beta$), as shown in FIG. 7D. The effective power law exponent ($\beta$) is empirically observed to be sensitive to both $\zeta_p$ and $\zeta_w$ since the transient dynamics are a consequence of interplay between the particle diffusiophoresis and the diffusiophoretic fluid advection. The exponent $\beta$ is given the inset of FIG. 7D for a wide range of $\zeta_p$ and $\zeta_w$ and can be used to determine $\zeta_w$ from a known $\zeta_p$.

A prerequisite for measuring $\zeta_w$ using this method is that $\Gamma_p$ must be larger than $\Gamma_w$. If $\Gamma_w \geq \Gamma_p$, the constant particle inlet condition for the simulations becomes invalid, since the number of particles leaving the pore due to the circulating flow is greater than the number entering the pore.

Figure 7E:
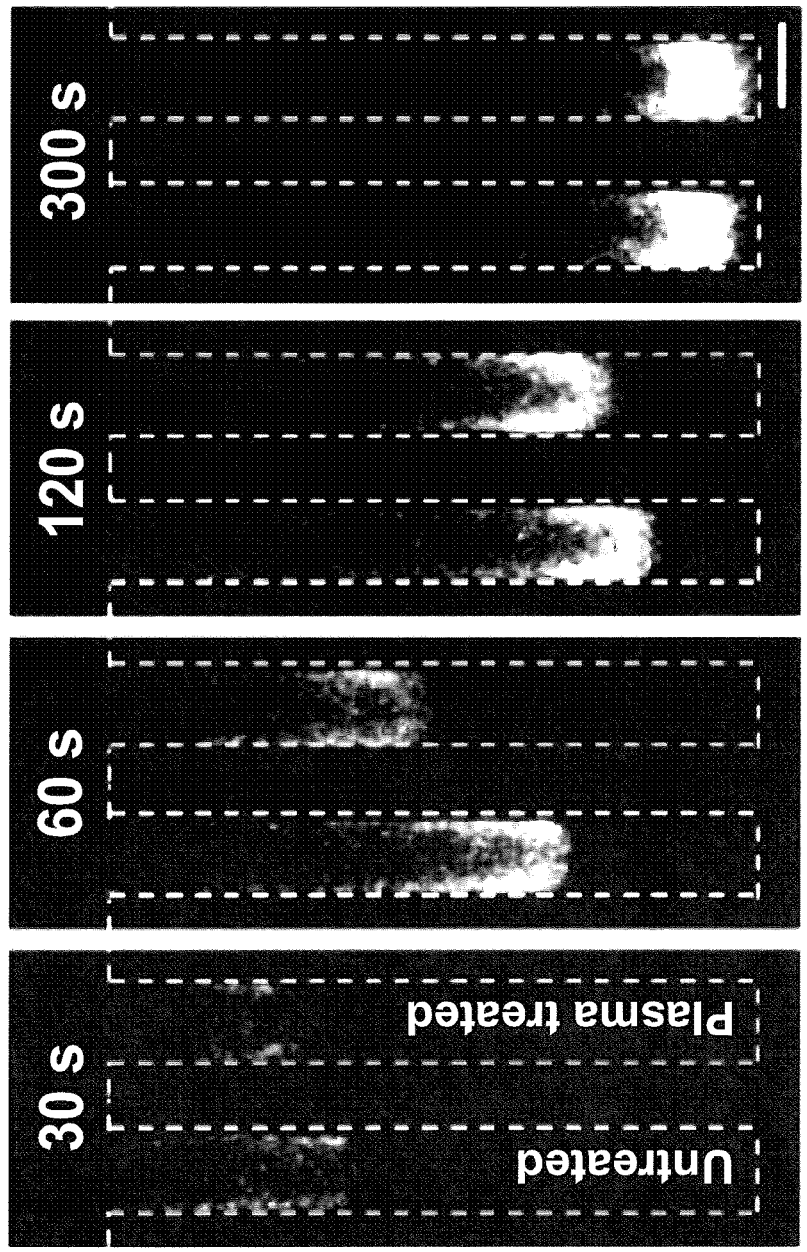
FIG. 7E illustrates a comparison of colloidal particle migration in bare and plasma treated PDMS channels. The scale bar is 50 μm.
Figure 7F:
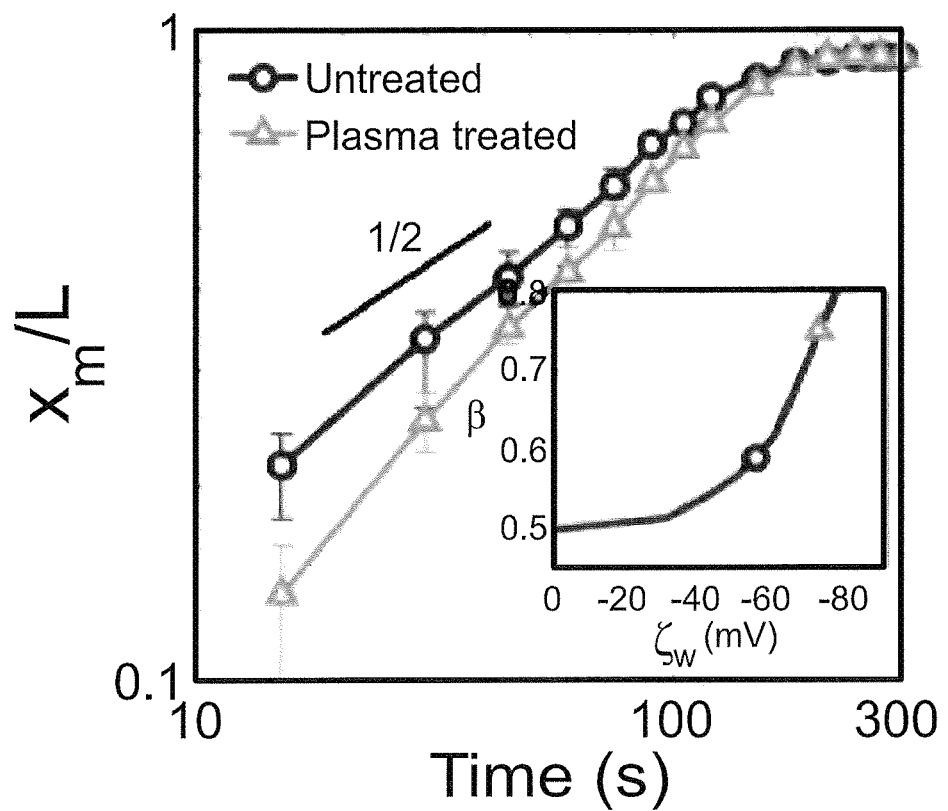
FIG. 7F illustrates corresponding particle peak locations over time in the plasma treated and untreated channels of FIG. 7e. The curve in the inset indicates $\beta$ versus $\zeta_w$ with $\zeta_p$=−80 mV.

This method is demonstrated by performing experiments with polystyrene particles in bare and plasma-treated poly-(dimethylsiloxane) (PDMS) channels (FIG. 7E). Plasma treatment significantly increases the surface charge, thereby increasing $\zeta_w$. As predicted, the plasma-treated channel exhibits much slower migration in the early stage compared to the untreated surface, although $x_m^\infty$ is similar for both cases. $\zeta_w$ was determined by obtaining $\beta$ (FIG. 7F) and comparing to simulation results (inset of FIG. 7f). The results are approximately −55 mV for the untreated −72 mV for the plasma-treated PDMS surfaces, which are in good agreement with prior literature values.

In another aspect, methods of determining the zeta potential of channel walls or surfaces via pressure measurements are described. A method of determining zeta potential of channel walls or surfaces, in some embodiments, comprises establishing a solute concentration gradient to induce a wall slip boundary condition in the channel. The pressure drop along the channel is measured, and channel wall diffusiophoretic mobility of the slip boundary condition is derived from the measured pressure drop. The zeta potential of the channel walls or surfaces is derived from this wall diffusiophoretic mobility. In some embodiments, for example, wall diffusiophoretic mobility is derived from a relation between the measured pressure drop and the wall slip velocity of the boundary condition.

Figure 8A:
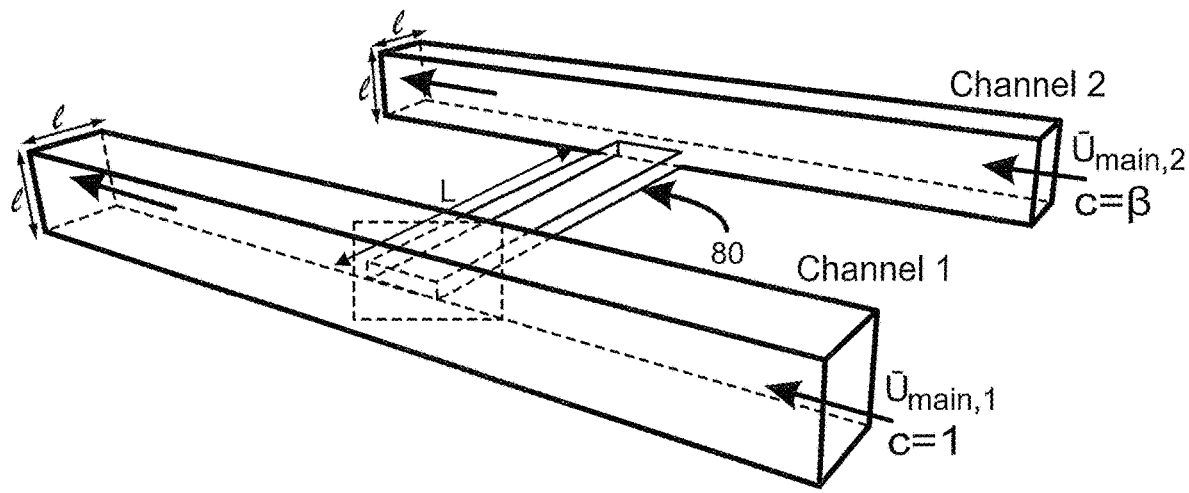
FIGS. 8A and 8B illustrate a system setup for determining wall zeta potential of a channel via pressure measurements, wherein ends of the channel are coupled to larger main channels.
Figure 8B:
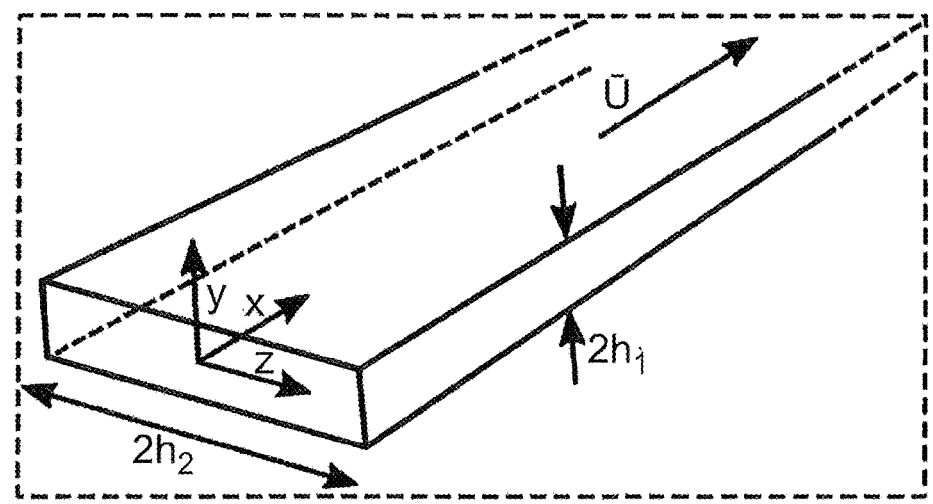

The solute concentration gradient can be established by any means consistent with the methods described herein. In some embodiments, for example, the solute gradient is established by coupling each channel end to a larger channel, wherein the larger channels carry solute concentrations at different speeds. FIGS. 8A and 8B illustrate such a setup wherein ends of a channel 80 are coupled to larger main channels (Channel 1 and Channel 2). In the embodiment of FIGS. 8a-b, Channel 1 carries a nondimensional solute concentration of c=1 at a mean speed of at a mean speed of $\overline{U}_{main,\,1}$ and Channel 2 carries a nondimensional solute concentration of c=β at a mean speed of $\overline{U}_{main,\,2}$. Dynamics within the pore are established by driving the main flows in Channels 1 and 2 at different speeds. For example, with $\overline{U}_{main,\,1} > \overline{U}_{main,\,2}$, a pressure gradient along the channel 80 will drive flow through the channel 80 at a mean speed of $\overline{U} > 0$. With steady inlet/outlet conditions, a steady-state solute concentration gradient will develop within the channel 80 on a timescale of $L^2/D_s$, where for low Reynolds numbers the flow is quasi-steady with respect to the solute dynamics, and wherein L is channel 80 length and $D_s$ is solute diffusivity. As this solute gradient develops, slip boundary conditions at the channel 80 walls drive recirculating secondary flows through diffusioosmosis, which cause deviations in the pressure gradient along the channel 80. This pressure gradient is directly related to the zeta potential of the channel 80 walls, making possible the use of such a system to perform zeta potentiometry of surfaces using fluid measurements. FIG. 8b is a magnified view of the channel 80 of dimensions $2\,h_1 \times 2\,h_2$ wherein the solid arrows denote the direction of flow.

The equations governing the coupled fluid/solute dynamic include the Navier-Stokes and continuity equations, as well as the advection-diffusion equation for the dissolved solute dynamics. Analytical solutions can be achieved via the lubrication approximation for the case of long narrow channels. The unique feature that differentiates methods and systems described herein, including that illustrated in FIGS. 8a and 8b, from a traditional pressure-driven Poiseuille flow calculation is the addition of wall slip boundary conditions on the pore walls due to the action of diffusioosmosis that is driven by local solute concentration gradients. The slip boundary conditions result in deviations of the pressure gradient within the channel from the Poiseuille flow case with no-slip boundaries. As shown below, zeta potential of the channel surfaces can be calculated directly from the total pressure drop along the channel.

The pressure drop along the channel $\Delta p = p(1) - p(0)$ is given by Equation (10):

$$\Delta p = \frac{3}{3C^* - 1}\left(1 + \frac{\Gamma_w}{L\overline{U}}\ln\beta\right) \tag{10}$$

Therefore, the pressure drop is uniquely specified by the solute concentration ratio β, the channel aspect ratio $h_1/h_2$ (through $C^*$), and the dimensionless diffusioosmotic mobility of the channel walls $$\frac{\Gamma_w}{L\overline{U}},$$

where $\Gamma_w$ is channel wall or channel surface diffusioosmotic mobility. For a typical system, $h_1/h_2$ and β will be given system design parameters. Equation 10 then directly relates the diffusioosmotic mobility of the channel walls with the total pressure drop Δp along the length of the channel, which may be measured. Therefore, in practice, the measurement of a single pressure drop in a microfluidic system is sufficient to determine wall diffusioosmotic mobility $\Gamma_w$, wherein zeta potential of the channel walls or channel surfaces can be derived from $\Gamma_w$.

Zeta potential (ζ) can be proportional to the logarithm of the solute concentration for the case of symmetric electrolytes with a valence of one for a wide range of solute concentrations. Specifically, if the cations do not show specific adsorption, the zeta potential is given as $$\zeta = -a_1 \ln c$$

where $a_1$ is a constant of proportionality. Then neglecting corrections due to finite Debye layer effects, the diffusioosmotic mobility can be written as Equation (11):

$$\Gamma_w = \frac{\epsilon}{\mu}\left(\frac{k_B T}{Ze}\right)^2\left[\left(\frac{D_+ - D_-}{D_+ + D_-}\right)\frac{Ze\zeta}{k_B T} + 4\ln\cosh\left(\frac{Ze\zeta}{4k_B T}\right)\right] \tag{11}$$

where $\epsilon$ is the permittivity of the medium, μ is the dynamic viscosity of the medium, $k_B$ is the Boltzman constant, T is the absolute temperature, e is the elementary charge, Z is the valence of the solute, $D_+$ and $D_-$ are the diffusivity of cations and anions respectively, and ζ is zeta potential of the channel walls or surfaces.

Figure 9:
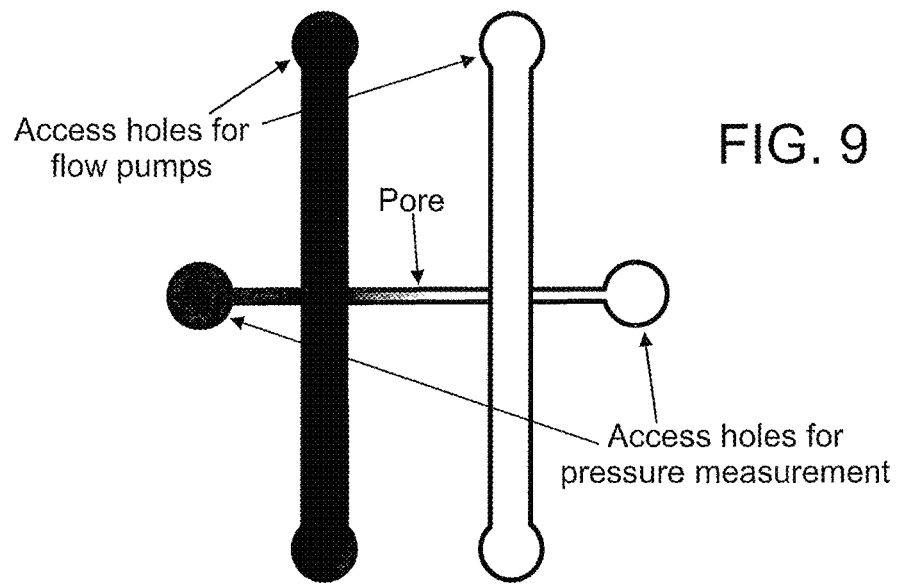
FIG. 9 illustrates a system design for measuring zeta potential of channel walls or surfaces according to some embodiments.

FIG. 9 illustrates a system design for measuring zeta potential of channel walls or surfaces according to some embodiments. As illustrated in FIG. 9, the channel or pore of interest is connected to two main channels as in FIG. 8. Notably, the pore extends through the two main channels for connection to pressure measurement ports. The system also provides holes or ports for connecting the main channels to flow pumps.

Channels employed in one or more of the methods described herein can have any dimensions not inconsistent with the objectives of the present invention. In some embodiments, channels are of dimensions suitable for microfluidic analysis. Additionally, fluid advective velocities in the channels can be controlled with one or more pumps. As detailed herein, fluid advective velocity can include a diffusioosmotic component or contribution, which is a function of at least channel wall zeta potential. Moreover, diffusioosmotic velocity is fluid velocity at the channel wall and is incorporated into fluid advective velocity along with the pressure induced flow. In some embodiments, fluids employed in the present methods are one or more biological fluids. In other embodiments, the fluids are non-biological fluids.

Particle manipulation and/or separation methods and systems described herein can be employed in a variety of applications including, but not limited to, fluid filtration, such as water filtration, particle sorting, separation, and focusing, and diagnostic and measurement applications.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A method of manipulating particle motion comprising: introducing a fluid into a channel, the fluid comprising particles; and
   driving particle accumulation to a preselected location in the channel by setting advective velocity of the fluid to offset diffusiophoretic velocity of the particles at the preselected location.

2. The method of claim 1, wherein diffusiophoretic velocity of the particles is a function of particle size, particle surface charge, strength of a solute gradient in the fluid or various combinations thereof.

3. The method of claim 2, wherein the solute gradient is established by connecting the channel with a second channel transporting fluid having a differing solute concentration.

4. The method of claim 1 further comprising characterizing one or more properties of the accumulated particles.

5. The method of claim 1 further comprising removing the particles from the channel.

6. The method of claim 1, wherein non-accumulated particles in the fluid are passed out of the channel.

7. The method of claim 1, wherein the particles comprise one or more biomolecular species.

8. The method of claim 7, wherein the biomolecular species comprise small-molecule drugs, nucleic acids, proteins, viruses or mixtures thereof.

9. The method of claim 1, wherein the fluid advective velocity comprises a pressure contribution and a diffusioosmotic wall slip contribution.

10. A method of particle separation comprising:
introducing a fluid into a channel, the fluid comprising a mixture of particle species; and
separating the particle species in the fluid by driving accumulation of the particle species to preselected locations in the channel via setting advective velocity of the fluid to offset diffusiophoretic velocity of a particle species at each of the preselected locations.

11. The method of claim 10, wherein diffusiophoretic velocity of each particle species is a function of particle size, particle surface charge, strength of a solute gradient in the fluid or various combinations thereof.

12. The method of claim 11, wherein the solute gradient is established by connecting the channel with a second channel transporting fluid having a differing solute concentration.

13. The method of claim 10 further comprising characterizing the particle species accumulated at each of the preselected locations.

14. The method of claim 10 further comprising removing the separated particle species from the channel.

15. The method of claim 10, wherein the particles species comprise various biomolecular species.

16. The method of claim 10, wherein the fluid advective velocity comprises a pressure contribution and a diffusioosmotic wall slip contribution.

17. A method of particle analysis comprising:
introducing a fluid sample into a channel;
determining the presence of analyte particles in the fluid sample by driving accumulation of the analyte particles to a preselected location in the channel via setting advective velocity of the fluid sample to offset diffusiophoretic velocity of the analyte particles at the preselected location; and
detecting the presence of the analyte particles at the preselected location.

18. The method of claim 17, wherein diffusiophoretic velocity of the analyte particles is a function of particle size, particle surface charge, strength of a solute gradient in the fluid or various combinations thereof.

19. The method of claim 17 further comprising characterizing one or more properties of the accumulated analyte particles.

20. The method of claim 17 further comprising removing the analyte particles from the channel.

21. The method of claim 17, wherein the non-accumulated particles in the fluid are passed out of the channel.

22. The method of claim 17, wherein the fluid advective velocity comprises a pressure contribution and a diffusioosmotic wall slip contribution.

23. A method of particle analysis comprising:
introducing a fluid sample into a channel;
determining the presence of a plurality of analyte particle species in the fluid sample by driving accumulation of the analyte particle species to preselected locations in the channel via setting advective velocity of the fluid to offset diffusiophoretic velocity of an analyte particle species at each of the preselected locations; and
detecting the presence of the analyte particle species at each of the preselected locations.

24. The method of claim 23, where diffusiophoretic velocity of the each analyte species is a function of particle size, particle surface charge, strength of a solute gradient in the fluid or various combinations thereof.

25. The method of claim 23 further comprising selectively removing one or more of the analyte species from the channel.

26. The method of claim 23 further comprising characterizing one or more properties of the separated analyte species.

27. The method of claim 23, wherein the analyte species comprise biomolecular species.

28. The method of claim 24, wherein the biomolecular species comprise small-molecule drugs, nucleic acids, proteins and/or viruses.

29. A method of determining particle zeta potential comprising:
introducing a fluid into a channel, the fluid having an advective velocity and solute concentration gradient;
introducing particles into the fluid, and accumulating the particles at a location in the channel where the advective velocity of the fluid is offset by diffusiophoretic velocity of the particles;
calculating the diffusiophoretic mobility of the particles from the location in the channel; and
deriving zeta potential of the particles from the calculated diffusiophoretic mobility.

30. The method of claim 29, wherein the solute gradient is established by connecting the channel with a second channel transporting fluid having a differing solute concentration.

* * * * *